Patented Aug. 31, 1937

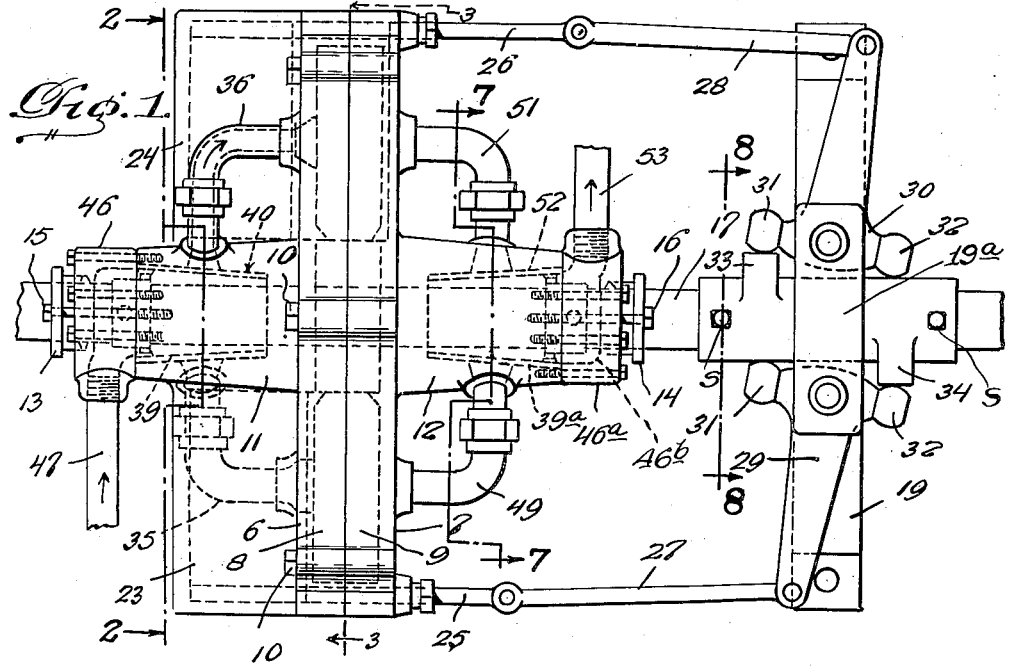
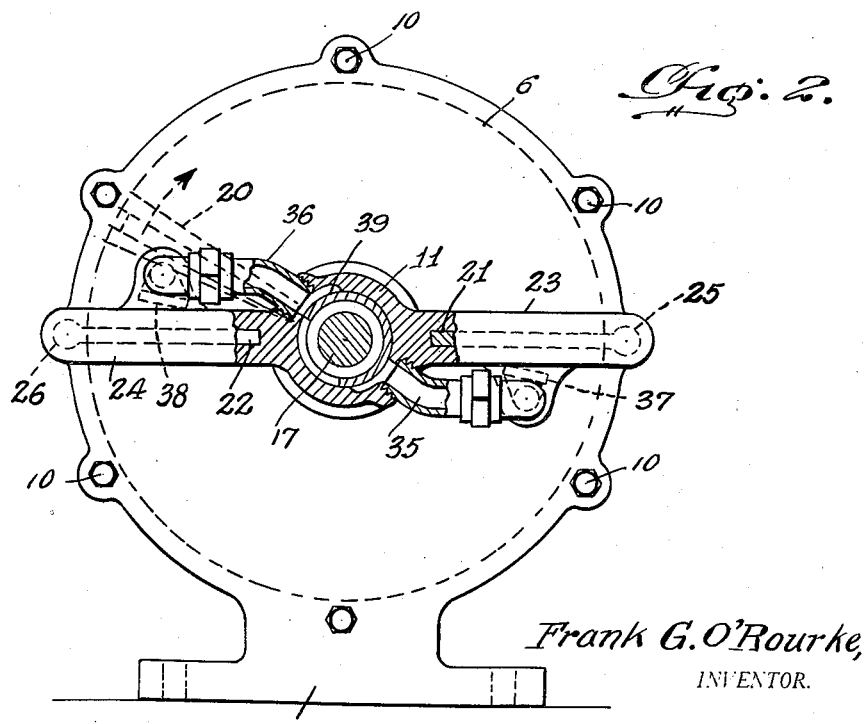

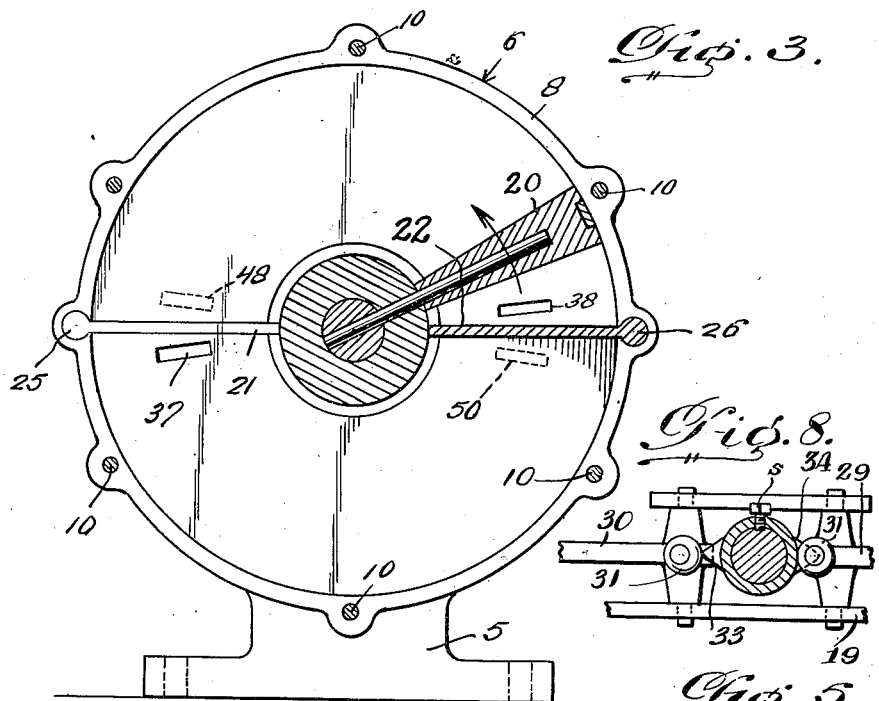
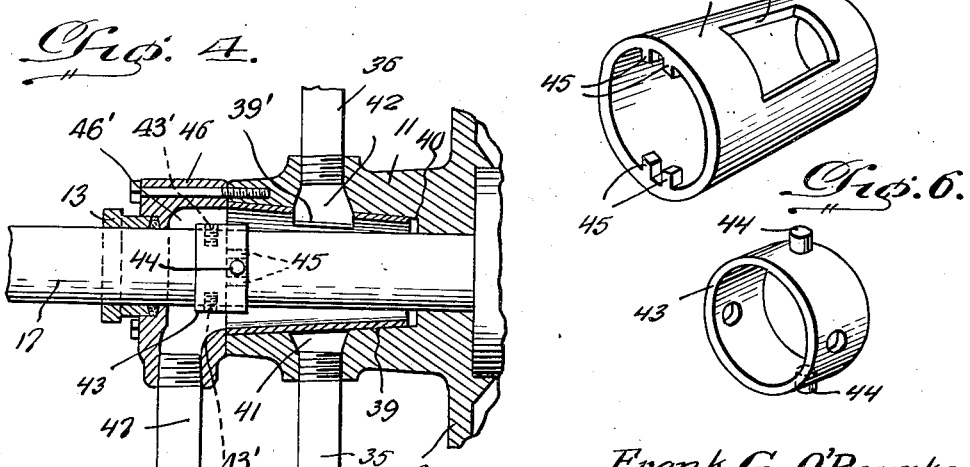

2,091,520

UNITED STATES PATENT OFFICE 2,091,520

ROTARY ENGINE

Frank G. O'Rourke, Blasdell, N. Y., assignor of one-twentieth to Cleveland W. Crosby, Lackawanna, N. Y.

Application June 26, 1933, Serial No. 677,716

5 Claims. (Cl. 121—73)

This invention relates to rotary engines, and has more particular reference to certain improvements upon the construction illustrated in my United States Patent No. 1,473,249, dated November 6, 1923.

An important object of the present invention is to provide a rotary engine of the type disclosed in my above-mentioned patent with novel means whereby the supply and exhaust of motive fluid to and from the expansion chambers of the cylinder is automatically controlled.

A further object of the present invention is to provide a rotary engine of the above type wherein two abutments and intake and exhaust valves are so timed and arranged that each charge of fluid under pressure admitted to the cylinder behind the piston is utilized to drive said piston substantially two-thirds of a revolution, and so that the previous charge is still acting to drive the piston when a new charge is admitted, thereby causing successive charges to overlap in their driving action upon the piston so that the latter is continuously subjected to the action of high pressure for insuring maximum power at all speeds and high pressure against the piston at all points in its path of revolution when the engine is in operation, thereby enabling efficient operation of the engine without the counterbalancing influence of a fly wheel.

The invention consists in the novel form, combination and arrangement of parts hereinafter more fully described, shown in the accompanying drawings, and claimed.

In the drawings:

Figure 1 is a top plan view of a rotary engine embodying the present invention.

Figure 2 is a section on line 2—2 of Figure 1.

Figure 3 is a vertical section on line 3—3 of Figure 1.

Figure 4 is an enlarged fragmentary horizontal section through one of the rotary valves and adjacent parts.

Figure 5 is an enlarged perspective view of one of the rotary valves.

Figure 6 is an enlarged perspective view of one of the valve driving collars.

Figure 7 is a section on line 7—7 of Figure 1.

Figure 8 is a section on line 8—8 of Figure 1.

Referring more in detail to the drawings, the present invention includes a stator having a suitable flanged base 5 to facilitate mounting of the same upon a suitable foundation or support, and composed of opposed half sections 6 and 7 having flanges 8 and 9 directed toward each other, said sections being bolted together as at 10 to afford a circular cylinder.

The stator is provided with oppositely projecting central tapered bearings 11 and 12 having packing means 13 and 14 at their outer ends secured in place by means of adjusting devices 15 and 16. The shaft 17 which extends through the stator is mounted in a bearing 19a on the upper portion of a support or pedestal 19 mounted at one side of the stator.

As illustrated in Figure 3, a piston 20 is extended radially from the shaft 17 and is rotatable within the cylinder or stator and cooperates with a pair of diametrically opposite axially sliding abutments 21 and 22 in forming two expansion chambers each adapted for the reception of fluid under pressure.

The abutments 21 and 22 are slidable within casings 23 and 24 provided on one side of the stator at opposite sides of the bearing 11. These casings may be of the general form and construction illustrated at 24 in my above-mentioned patent and at 19 in my U. S. Patent No. 1,247,868 dated November 27, 1917. The sliding abutments 21 and 22, which are adapted to be alternately moved to a position to extend across the interior of the stator, are provided with rods 25 and 26 connected to links 27 and 28 which are in turn connected with the outwardly extending branches of bell crank levers 29 and 30. The inner ends of bell crank levers 29 and 30 are provided with oppositely extending branches terminating in heads or rollers 31 and 32 arranged in the path of travel of cams 33 and 34 secured on the shaft 17 by set screws or other suitable means as indicated at s. It will be observed that when the shaft 17 is rotated, the cams 33 and 34 will also be rotated for alternately rocking the bell crank levers 29 and 30 in opposite directions. Therefore, when the cam 33 engages the roller 31 on bell crank lever 30, the link 28 and consequently the abutment 22 will be moved longitudinally to extend across the cylinder or stator behind the piston 20, while the cam 34 will simultaneously engage the roller 32 on the bell crank lever 29 to move link 27 and abutment 21 in the opposite direction to permit the passage of the piston 20. Also, further rotation of shaft 17 causes the lever 30 to be rocked in the opposite direction to render abutment 22 inoperative and lever 29 is simultaneously reversely rocked to render abutment 21 operative.

Fluid under pressure is conducted to the stator alternately through pipes 35 and 36 and ports 37 and 38 by a hollow rotary tapered sleeve valve 39 arranged in a valve chamber 40 formed by enlarging the intermediate portion of the axial bore of bearing 11. The valve 39 is arranged in spaced concentric relation to shaft 17, as well as being operatively connected at one end with said shaft 17 so as to be driven by the latter. As valve 39 is rotated, its port 39' is caused to alternately register with the opposed ports 41 and 42 provided in the bearing 11 and with which the adjacent ends of pipes 35 and 36 communicate. The driving connection between valve 39 and shaft 17 may consist of a collar 43 secured on shaft 17 by screws 43' and having outwardly projecting pins 44 arranged to engage between pairs of spaced lugs 45 projecting inwardly from the larger outer end portion of valve 39. The bearing 11 preferably embodies a removable outer end section 46 to facilitate assembly of the valve 39 or removal thereof relative to its chamber 40. This section 46 is hollow to provide a fluid pressure inlet chamber 46' communicating with the interior of valve 39 at the outer and larger end of the valve and having a fluid pressure supply pipe 47 connected therewith.

The expanded motive fluid passes from the stator alternately by way of a port 48 and a pipe 49, and by way of a port 50 and a pipe 51, such exhaust being controlled by a rotary tapered valve 39a similar in construction to the valve 39 and arranged in a valve chamber 52 of bearing 12 similar to valve chamber 40 of bearing 11. Both the inlet and exhaust valves are similarly mounted, constructed and driven, and illustration and description of one will suffice for both. It may be mentioned, however, that the bearing 12 also includes a detachable outer section 46a having a chamber 46b to communicate with the interior of exhaust valve 39a and having a final exhaust discharge pipe 53 connected therewith.

In operation, as seen in Figures 1 and 3 the fluid under pressure is supplied at the proper intervals to the chambers of the stator by means of the tapered valve 39, and the fluid acts against piston 20 and simultaneously reacts against the operative abutment 22 therebehind, thereby forcing the piston to rotate for imparting a similar motion to the shaft 17, the previous spent charge in front of piston 20 being simultaneously exhausted from the stator through port 50. When the piston passes the position where the abutment 21 is located, such abutment is moved inwardly to operative position so that the fluid under pressure admitted through port 37 may react thereagainst. As the piston 20 moves further on, so as to pass the position where abutment 22 is located, the latter is moved inwardly to operative position so that the fluid under pressure admitted through port 38 may react thereagainst. In this way, a charge of fluid is admitted twice for each complete revolution of piston 20.

A very important feature of the present invention consists in the fact that the two abutments and the intake and exhaust valves are so timed and so arranged that each charge of fluid under pressure admitted to the cylinder behind the piston 20 is utilized to drive said piston substantially two-thirds of a revolution, and so that the previous charge is still acting to drive the piston when the new charge is admitted, thereby causing successive charges to overlap in their driving action upon the piston so that the latter is continuously subjected to the action of high pressure. This insures maximum power at all speeds and high pressure against the piston at all points in its path of revolution when the engine is in operation, thereby enabling efficient operation of the engine without the counterbalancing influence of a fly wheel. With the parts in the position of Figure 3, the charge is about to be admitted through port 38 between abutment 22 and piston 20, for driving the latter in the direction of the arrow. At this time, exhaust passage from port 50 is about to be opened and the passages to and from ports 37 and 48 are closed. Immediately after piston 20 passes abutment 21, the latter is moved to operative position through the existing zone of high pressure, the piston 20 moving some distance beyond abutment 21 by the time the latter has completely closed. A part of the active charge is thus trapped between abutment 21 and piston 20 so as to still be acting upon the latter after passing abutment 21. At the same time, this part of the active charge is then immediately reinforced by a new active charge admitted through port 37. Were such new charge not admitted, the trapped portion of the previous active charge would be sufficient to complete the movement of piston 20 for approximately two-thirds of a revolution. It is thus apparent that the action of successive charges on the piston 20 is overlapping so that the action of fluid pressure against the piston is continuous for avoiding any dead center. It will of course be understood that as soon as abutment 21 is closed or operatively positioned exhaust port 50 and the passage to intake port 38 will be closed while the passage from exhaust port 48 is simultaneously opened. While the fluid under pressure is then reacting against abutment 21 for driving piston 20, the previous charge in front of piston 20 is allowed to flow out of the cylinder by way of port 48. It will therefore be obvious that there is high pressure behind the piston at all times while working, and such pressure is reacting against an operative abutment behind the piston, the active charge being admitted by way of the port adjacent said active abutment, the previous charge being permitted to escape by way of a port also adjacent but at the opposite side of said active abutment, and the ports adjacent the other abutment being closed. This continuous high pressure drive in a rotary engine of the present type constitutes a decided improvement, the same being made possible not only by reason of the presence of two diametrically opposed abutments, but by a proper timing of their operation and by proper timing of the selective opening of inlet and exhaust ports arranged at opposite sides of each abutment.

It will be seen that the construction is exceedingly durable and compact, the valve mechanism being especially composed of a minimum number of durable parts not likely to readily get out of order. Obviously, the direction of rotation of piston 20 might be easily reversed by supplying the motive fluid by way of pipe 53 and exhausting the same by way of pipe 47, thereby utilizing the normal exhaust valve 52 as an intake valve, and the normal intake valve 39 as an exhaust valve.

The present engine will be found to operate with extreme efficiency and to require little attention or repair. Also, the engine will be found to develop maximum power at all speeds, due to the manner of using the plurality of diametrically opposed alternately acting abutments and means to introduce the motive fluid immediately upon passage of the piston past each abutment. Minor changes are contemplated within the spirit and scope of the invention as claimed.

What I claim as new is:

1. A rotary engine comprising a stator having oppositely projecting bearings, the bores of said bearings being enlarged intermediate their ends to provide valve chambers, hollow rotary sleeve valves removably fitted and secured in said chambers, one of the valves for controlling the supply of fluid under pressure to and the other valve controlling exhaust of the expanded fluid from said stator, a shaft extending through the stator and its bearings in spaced relation to and axially of said valves, direct separable driving connections between said shaft and said valves, a radial piston carried by said shaft within said stator, and means to supply one of said valve chambers with fluid under pressure through the outer end of one of said valve chambers.

2. A rotary engine comprising a stator having oppositely projecting bearings, the bores of said bearings being enlarged intermediate their ends to provide valve chambers, hollow rotary sleeve valves removably fitted and secured in said chambers one of the valves for controlling the supply of fluid under pressure to and the other valve controlling exhaust of the expanded fluid from said stator, a shaft extending through the stator and its bearings in spaced relation to and axially of said valves, direct separable driving connections between said shaft and said valves, a radial piston carried by said shaft within said stator, and means to supply one of said valve chambers with fluid under pressure through the outer end of one of said valve chambers, said valves and valve chambers being tapered larger outwardly, and said bearings including detachable outer end sections provided with shaft-packing means and removable to facilitate assembly or removal of the valves relative to said shaft and said chambers.

3. A rotary engine comprising a stator having oppositely projecting bearings, the bores of said bearings being enlarged intermediate their ends to provide valve chambers, hollow rotary sleeve valves removably fitted and secured in said chambers one of the valves for controlling the supply of fluid under pressure to and the other valve controlling exhaust of the expanded fluid from said stator, a shaft extending through the stator and its bearings in spaced relation to and axially of said valves, direct separable driving connections between said shaft and said valves, a radial piston carried by said shaft within said stator, and means to supply one of said valve chambers with fluid under pressure through the outer end of one of said valve chambers, each of said driving connections including a collar secured on the shaft within the outer end of the adjacent valve and having outwardly projecting pins, and pairs of spaced inwardly projecting lugs carried by the valve between which said pins project.

4. A rotary engine comprising a stator, a shaft extending through the stator and provided with a radial piston, two abutments movable to and from a position in the stator extending across the path of the piston, said stator having an exhaust and an inlet port respectively adjacent and at opposite sides of each abutment, said abutments being positioned at diametrically opposite sides of said shaft, means to alternately move said abutments to and from the path of the piston, and valve mechanism for controlling the supply of fluid under pressure to and the exhaust of the expanded fluid from said stator by way of said ports, said valve mechanism being timed to permit supply of fluid under pressure to and exhaust of expanded fluid from the stator respectively through the ports at opposite sides of each abutment when the latter is moved to operative position and to simultaneously prevent passage of fluid to or from the stator through the ports at opposite sides of the other abutment, said abutment moving means being timed to move each abutment to operative position promptly after passage of the piston by said abutment, whereby a portion of a previous active charge will be trapped between the operative abutment and the piston for cooperating with the next new charge in driving the latter so that the action of the charges upon the piston will be overlapping for effecting a continuous drive of the piston under high pressure.

5. In a rotary engine, a hollow circular stator provided at opposite sides with central outwardly projecting shaft bearings, each of said bearings having an axial bore whose intermediate portion is enlarged to provide a valve chamber which tapers larger in an outward direction, means including hollow tapered sleeve valves rotatably fitted in the valve chambers of said bearings and having ports for respectively controlling the supply of fluid under pressure to and the exhaust of expanded fluid from said stator, one such sleeve valve in each valve chamber, said bearings further having detachable outer sections provided with chambers which communicate with the interiors of said valves through the outer ends of the latter, fluid pressure supply and exhaust discharge pipes communicating with the chambers of the respective detachable bearing sections, a rotatable shaft extending through the stator and its bearings, a radial piston carried by said shaft and arranged in said stator, and direct driving connections between said shaft and said valves permitting free axial insertion or removal of said valves into or from the bearings upon detachment of the outer sections of said bearings.

FRANK G. O'ROURKE.